US008252712B2

(12) United States Patent
Koestner et al.

(10) Patent No.: US 8,252,712 B2
(45) Date of Patent: Aug. 28, 2012

(54) POLYMER DISPERSANT ADDITION TO FUEL CELL ELECTRODE INKS FOR IMPROVED MANUFACTURABILITY

(75) Inventors: Roland J. Koestner, Penfield, NY (US); Sean M Mackinnon, Fairport, NY (US); Timothy J. Fuller, Pittsford, NY (US); Jeanette E. Owejan, Honeoye, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 278 days.

(21) Appl. No.: 12/551,237

(22) Filed: Nov. 13, 2009

(65) Prior Publication Data

US 2011/0117472 A1 May 19, 2011

(51) Int. Cl.
*H01M 8/10* (2006.01)
*H01M 4/86* (2006.01)
*H01M 4/88* (2006.01)
*B01J 21/18* (2006.01)
*B05D 5/12* (2006.01)

(52) U.S. Cl. ........ 502/173; 502/101; 502/159; 502/168; 429/483

(58) Field of Classification Search ........................ None
See application file for complete search history.

(56) References Cited

U.S. PATENT DOCUMENTS 5,006,408 A 4/1991 Green et al.
5,021,602 A 6/1991 Clement et al.
5,037,917 A 8/1991 Babb et al.
5,066,746 A 11/1991 Clement et al.
5,159,037 A 10/1992 Clement et al.
5,159,038 A 10/1992 Babb et al.
5,910,378 A 6/1999 Debe et al.
6,124,060 A 9/2000 Akita et al.
6,183,668 B1 2/2001 Debe et al.
6,187,468 B1 * 2/2001 Shinkai et al. ................ 429/481
6,277,512 B1 8/2001 Hamrock et al.
6,444,343 B1 9/2002 Prakash et al.
6,523,699 B1 2/2003 Akita et al.
6,559,237 B1 5/2003 Mao et al.
6,847,518 B2 1/2005 Fukuda et al.
6,875,537 B2 4/2005 Tani et al.
6,926,984 B2 8/2005 Asano et al.
6,933,068 B2 8/2005 Asano et al.
6,953,653 B2 10/2005 Smith et al.
6,986,962 B2 1/2006 Oyanagi et al.
7,001,929 B2 2/2006 Goto et al.
7,045,241 B2 5/2006 Akita et al.
7,153,802 B2 * 12/2006 Manco et al. ................. 502/101
2001/0018144 A1 8/2001 Watakabe et al.
(Continued)

FOREIGN PATENT DOCUMENTS

JP 2003535929 t 12/2003
(Continued)

OTHER PUBLICATIONS

SicFinder search history.*

(Continued)

*Primary Examiner* — Melvin C Mayes
*Assistant Examiner* — Yun Qian
(74) *Attorney, Agent, or Firm* — Brooks Kushman P.C.

(57) ABSTRACT

An ink composition for forming a fuel cell electrode includes a catalyst composition, a polymeric binder, a polymeric dispersant, and a solvent. The polymeric dispersant includes a perfluorocyclobutyl-containing polymer.

15 Claims, 12 Drawing Sheets

U.S. PATENT DOCUMENTS

| | | | | |
|---|---|---|---|---|
| 2002/0014405 | A1 | 2/2002 | Arcella et al. | |
| 2003/0017379 | A1 | 1/2003 | Menashi | |
| 2004/0214058 | A1 | 10/2004 | Tada et al. | |
| 2004/0214065 | A1 | 10/2004 | Kanaoka et al. | |
| 2005/0014927 | A1 | 1/2005 | Akita | |
| 2005/0043487 | A1 | 2/2005 | Felix et al. | |
| 2005/0048342 | A1 | 3/2005 | Wakahoi et al. | |
| 2005/0053810 | A1 | 3/2005 | Kato et al. | |
| 2005/0058864 | A1 | 3/2005 | Goebel | |
| 2005/0064260 | A1 | 3/2005 | Otsuki et al. | |
| 2005/0100770 | A1 | 5/2005 | Sugawara et al. | |
| 2005/0106440 | A1 | 5/2005 | Komiya | |
| 2005/0116206 | A1 | 6/2005 | Kakuta et al. | |
| 2005/0130024 | A1 | 6/2005 | Otsuki et al. | |
| 2005/0142397 | A1 | 6/2005 | Wakahoi et al. | |
| 2005/0143530 | A1 | 6/2005 | Iwadate et al. | |
| 2005/0175886 | A1 | 8/2005 | Fukuda et al. | |
| 2005/0197467 | A1 | 9/2005 | Komiya et al. | |
| 2005/0227138 | A1 | 10/2005 | Fukuda et al. | |
| 2005/0233181 | A1 | 10/2005 | Wariishi et al. | |
| 2005/0260474 | A1 | 11/2005 | Asano et al. | |
| 2006/0019147 | A1 | 1/2006 | Fukuda et al. | |
| 2006/0127728 | A1 | 6/2006 | Otsuki et al. | |
| 2006/0177719 | A1 | 8/2006 | Fuller et al. | |
| 2007/0042242 | A1 | 2/2007 | Tada et al. | |
| 2007/0099054 | A1 | 5/2007 | Fuller et al. | |
| 2007/0141237 | A1 | 6/2007 | Okiyama et al. | |
| 2008/0027152 | A1 | 1/2008 | Maier et al. | |
| 2009/0278083 | A1 | 11/2009 | Fuller et al. | |
| 2009/0278091 | A1 | 11/2009 | Mackinnon et al. | |
| 2009/0281245 | A1 | 11/2009 | Mackinnon et al. | |
| 2009/0281262 | A1 | 11/2009 | Mackinnon et al. | |
| 2009/0281270 | A1 | 11/2009 | Fuller et al. | |
| 2011/0053007 | A1* | 3/2011 | MacKinnon et al. | 429/413 |

FOREIGN PATENT DOCUMENTS

| | | | |
|---|---|---|---|
| JP | 2005129298 | A | 5/2005 |
| JP | 2005166557 | A | 6/2005 |
| JP | 2005179380 | A | 7/2005 |
| JP | 2009 249 487 | A | 10/2009 |
| WO | 2004/051776 | | 6/2004 |
| WO | 2007/052954 | A1 | 5/2007 |

OTHER PUBLICATIONS

Smith, D.W. et al., “Perfluorocyclobutane Aromatic Polyethers. Synthesis and Characterization of New Siloxane-Containing Fluoropolymers,” Macromolecules 1996, v. 29, pp. 852-860.

Smith, D.W. et al., “Perfluorocyclobutane (PFCB) polyaryl ethers: versatile coatings material,” J. of Fluorine Chem., v. 104, pp. 109-117 (2000).

Souzy, R. et al., “Functional fluoropolymers for fuel cell membranes,” Solid State Ionics, v. 176, pp. 2839-2848 (2005).

Souzy, R. et al., “Functional fluoropolymers for fuel cell membranes,” Prog. Polm. Sci. 30, 2005, pp. 644-687.

“Fluorel Technical Data Sheets,” MatWeb Material Property Data website, http://www.matweb.com/search/GetMatIsByTradename.aspx?navletter=F&tn=Fluorel%E2%84%A2.

Nafion perfluorinated resin, Sigma-Aldrich Online Catalog, http://www.sigmaaldrich.com/catalog/ProductDetail.do?lang=en&N4=495786|ALDRICH&N5=SEARCH_CONCAT_PNO|BRAND_KEY&F=SPEC.

Ford, L.A. et al., “New Aromatic Perfluorovinyl Ether Monomers Containing the Sulfonimide Acid Functionality,” Polymeric Materials Science & Eng., v. 83, 2000, pp. 10-11 (American Chemical Society).

Souzy, R. et al., “Synthesis and (co)polymerization of monofluoro, difluoro, trifluorostyrene and ((trifluorovinyl)oxy) benzene,” Prog. Polm. Sci. 29 (2004), pp. 75-106.

* cited by examiner n, n' are numbers such that the molecular weights (Mn) is as specified

POLYMER DISPERSANT ADDITION TO FUEL CELL ELECTRODE INKS FOR IMPROVED MANUFACTURABILITY

BACKGROUND OF THE INVENTION

1. Field of the Invention

The present invention relates generally to an ink composition for forming fuel cell electrodes.

2. Background Art

Fuel cells are used as an electrical power source in many applications. In particular, fuel cells are proposed for use in automobiles to replace internal combustion engines. A commonly used fuel cell design uses a solid polymer electrolyte ("SPE") membrane or proton exchange membrane ("PEM"), to provide ion transport between the anode and cathode.

In proton exchange membrane type fuel cells, hydrogen is supplied to the anode as fuel and oxygen is supplied to the cathode as the oxidant. The oxygen can either be in pure form ($O_2$) or air (a mixture of $O_2$ and $N_2$). PEM fuel cells typically have a membrane electrode assembly ("MEA") in which a solid polymer membrane has an anode catalyst on one face, and a cathode catalyst on the opposite face. Protons flow from the anode through the ionically conductive polymer membrane to the cathode where they combine with oxygen to form water, which is discharged from the cell. The MEA is sandwiched between a pair of porous gas diffusion layers ("GDL"), which in turn are sandwiched between a pair of non-porous, electrically conductive elements or plates. The plates function as current collectors for the anode and the cathode, and contain appropriate channels and openings formed therein for distributing the fuel cell's gaseous reactants over the surface of respective anode and cathode catalysts. In order to produce electricity efficiently, the polymer electrolyte membrane of a PEM fuel cell must be thin, chemically stable, proton transmissive, non-electrically conductive and gas impermeable. In typical applications, fuel cells are provided in arrays of many individual fuel cell stacks in order to provide high levels of electrical power.

The electrode layers in PEM fuel cells typically comprise a Pt/carbon electrocatalyst coupled with a polymer that acts both as a binder and a proton conducting film. To achieve a more robust manufacturing process, the rheology of the electrode ink during the coating/drying steps is properly controlled through the addition of dispersants.

Accordingly, there is a need to improve the rheology of the electrode ink used in fuel cell applications.

SUMMARY OF THE INVENTION

The present invention solves one or more problems of the prior art by providing in at least one embodiment an ink composition for forming fuel cell electrodes. The ink composition of the present embodiment includes a catalyst composition, a polymeric binder, a polymeric dispersant, and a solvent. The polymeric dispersant includes a perfluorocyclobutyl-containing polymer. Advantageously, the present embodiment provides a dispersant polymer technology that is effective at very low addition amounts, avoids migration within a fuel cell stack and is durable in the highly corrosive operating environment typical of fuel cells.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the present invention will become more fully understood from the detailed description and the accompanying drawings, wherein.

DETAILED DESCRIPTION OF THE PREFERRED EMBODIMENT(S)

Figure 1:
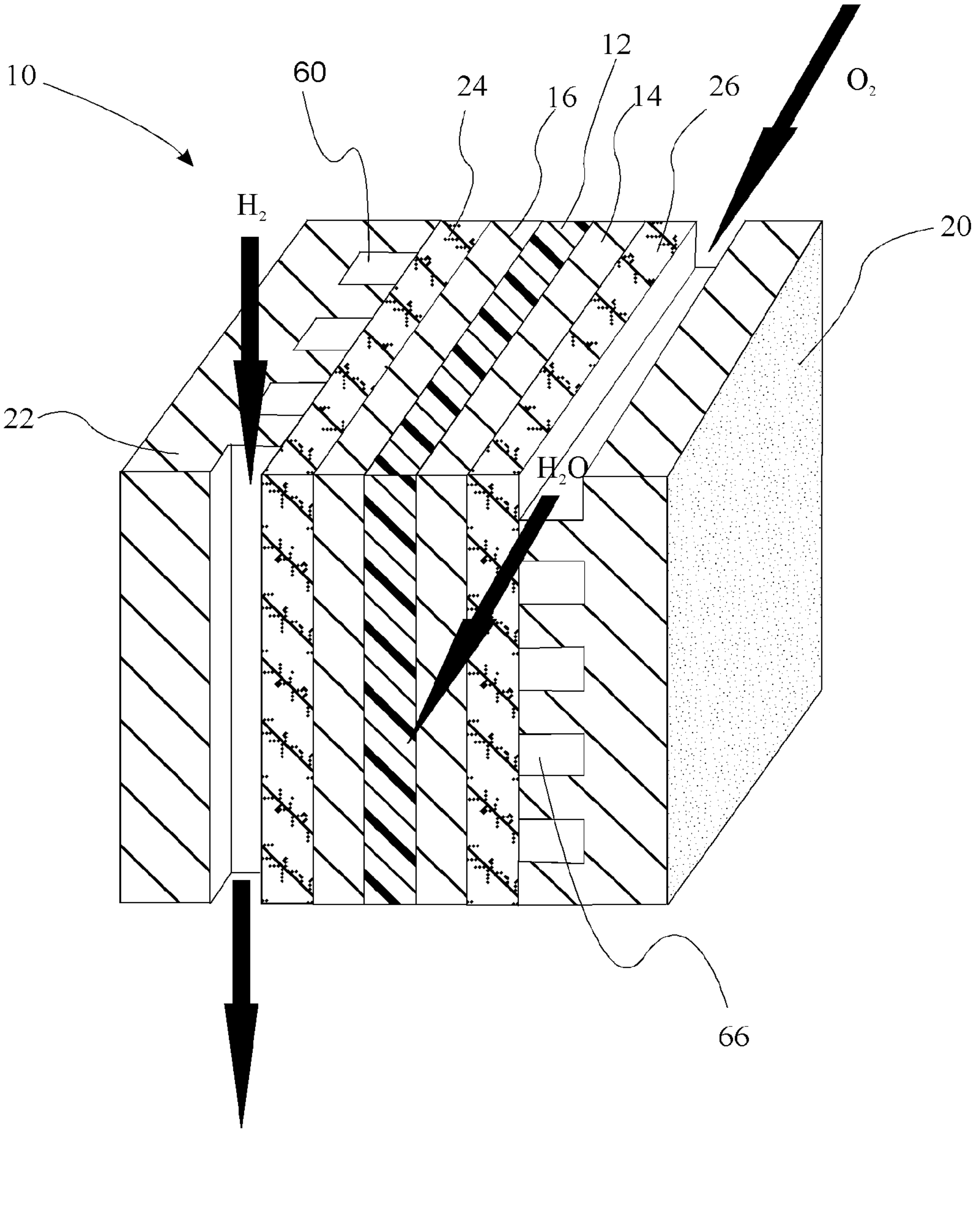
FIG. 1 is a perspective view of a fuel cell.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word “about” in describing the broadest scope of the invention. Practice within the numerical limits stated is generally preferred. Also, unless expressly stated to the contrary: percent, “parts of,” and ratio values are by weight; the term “polymer” includes “oligomer,” “copolymer,” “terpolymer,” and the like; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form “a,” “an,” and “the” comprise plural referents unless the context clearly indicates otherwise. For example, reference to a component in the singular is intended to comprise a plurality of components.

Throughout this application where publications are referenced, the disclosures of these publications in their entireties are hereby incorporated by reference into this application to more fully describe the state of the art to which this invention pertains.

With reference to FIG. 1, a fuel cell that incorporates electrode layers formed from a variation of an electrocatalyst ink composition is provided. PEM fuel cell 10 includes polymeric ion conductive membrane 12 disposed between cathode catalyst layer 14 and anode catalyst layer 16. One or both of cathode catalyst layer 14 and anode catalyst layer 16 is formed from the ink compositions set forth below. Fuel cell 10 also includes conductive plates 20, 22, gas channels 60 and 66, and gas diffusion layers 24 and 26.

In an embodiment of the present invention, an ink composition for forming fuel cell electrode catalyst layers is provided. The ink composition of the present embodiment includes a catalyst composition, a polymeric binder, a polymeric dispersant, and a solvent. The polymeric dispersant includes a perfluorocyclobutyl-containing polymer. In a variation, the perfluorocyclobutyl-containing polymer includes a hydrophilic region and a hydrophobic region. In a further refinement, the perfluorocyclobutyl-containing polymer includes a hydrophilic block and a hydrophobic block. In still a further refinement, the hydrophilic polymer block has an ion exchange capacity from about 1 to about 4 meq per gram.

The catalyst composition typically includes a precious metal or metal oxide. In a refinement, the precious metal or metal oxide is supported on a support material. Examples of precious metal catalysts include platinum, palladium, and gold. Oxides of these metals may also be utilized. Suitable catalyst support materials include, but are not limited to, carbon supports and metal oxide supports. Typically, the weight ratio of precious metal or precious metal oxide to support is from about 0.12 to 0.8. Moreover, the catalyst composition is present in an amount from about 1 to 10 weight percent of the total weight of the ink composition. In another refinement, the dispersant preferentially adsorbs to the support material.

As set forth above, the ink composition of the present embodiment also includes a polymeric binder. Examples of polymeric binders include, but are not limited to, sulfonated tetrafluoroethylene based fluoropolymer-copolymers (e.g. perfluorosulfonic acid polymers). Specific examples of such polymers include the Nafion™ line of polymers commercially available from E. I. du Pont de Nemours and Company. Typically, the polymeric binder is present in an amount from about 1 to about 5 weight percent of the total weight of the ink composition.

As set forth above, the first polymer includes cyclobutyl moiety. Suitable polymers having cyclobutyl moieties are disclosed in U.S. Pat. Pub. No. 20070099054, the entire disclosure of which is hereby incorporated by reference. In a refinement, the polymer dispersant is present in an amount from about 0.05 to 1.0 weight percent of the total weight of the ink composition.

The balance of the ink composition will include the solvent. Virtually any solvent compatible with the ink composition component may be used. Suitable solvents include, but are not limited to, alcohols (ethanol, isopropanol, etc), water and combinations thereof.

In a variation of the present invention, the hydrophilic polymer region comprises polymer segment 1:

$$E_0\text{-}P_1\text{-}Q_1\text{-}P_2 \qquad 1$$

wherein:

$E_0$ is a moiety having a protogenic group such as —$SO_2X$, —$PO_3H_2$, —COX, and the like;

$P_1$, $P_2$ are each independently absent, —O—, —S—, —SO—, —CO—, —$SO_2$—, —NH—, $NR_2$—, or —$R_3$—, $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

X is an —OH, a halogen, an ester, or

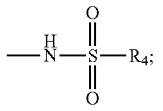

$R_4$ is trifluoromethyl, $C_{1-25}$ alkyl, $C_{1-25}$ perfluoroalkylene, $C_{1-25}$ aryl, or $E_1$ (see below), and $Q_1$ is a fluorinated cyclobutyl moiety.

In another variation of the present invention, the hydrophilic polymer region comprises polymer segments 2 while the hydrophobic polymer region comprises polymer segment 3:

$$[E_1(Z_1)_d]\text{—}P_1\text{-}Q_1\text{-}P_2 \qquad 2$$

$$E_2\text{-}P_3\text{-}Q_2\text{-}P_4 \qquad 3$$

wherein:

$Z_1$ is a protogenic group such as —$SO_2X$, —$PO_3H_2$, —COX, and the like;

$E_1$ is an aromatic containing moiety;

$E_2$ is an unsulfonated aromatic-containing and/or aliphatic-containing moiety;

X is an —OH, a halogen, an ester, or

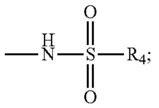

d is the number of $Z_1$ attached to $E_1$;

$P_1$, $P_2$, $P_3$, $P_4$ are each independently absent, —O—, —S—, —SO—, —CO—, —$SO_2$—, —NH—, $NR_2$—, or —$R_3$—;

$R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety. In a refinement, the polymer segment is repeated i times to form a first polymer block and polymer segment 2 is repeated j times to form a second polymer block. In one refinement, d is equal to the number of aromatic rings in $E_1$. In another refinement, each aromatic ring in $E_1$ can have 0, 1, 2, 3, or 4 $Z_1$ groups.

In another variation of the present invention, the hydrophilic polymer region comprises polymer segments 4 while the hydrophobic polymer region comprises polymer segment 5:

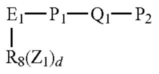 4

$$E_2—P_3—Q_2—P_4 \quad 5$$

wherein:

$Z_1$ is a protogenic group such as —$SO_2X$, —$PO_3H_2$, —COX, and the like;

$E_1$, $E_2$ are each independently an aromatic-containing and/or aliphatic-containing moiety;

X is an —OH, a halogen, an ester, or

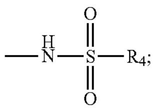

d is the number of $Z_1$ attached to $R_8$;

$P_1$, $P_2$, $P_3$, $P_4$ are each independently absent, —O—, —S—, —SO—, —CO—, —$SO_2$—, —NH—, $NR_2$—, or —$R_3$—;

$R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and $Q_1$, $Q_2$ are each independently a fluorinated cyclobutyl moiety. In a refinement of this variation, $R_8$ is $C_{1-25}$ alkylene, $C_{1-25}$ perfluoroalkylene, perfluoroalkyl ether, alkylether, or $C_{1-25}$ arylene. In another refinement, the polymer segment is repeated i times to form a first polymer block and polymer segment 2 is repeated j times to form a second polymer block. In one refinement, d is equal to the number of aromatic rings in $R_8$. In another refinement, each aromatic ring in $R_8$ can have 0, 1, 2, 3, or 4 $Z_1$ groups. In still another refinement, d is an integer from 1 to 4 on average.

In another variation of the present invention, the hydrophilic polymer region comprises polymer segments 6 while the hydrophobic polymer region comprises polymer segment 7:

$$E_1(SO_2X)_d—P_1\text{-}Q_1\text{-}P_2 \quad 6$$

$$E_2\text{-}P_3\text{-}Q_2\text{-}P_4 \quad 7$$

connected by a linking group $L_1$ to form polymer units 8 and 9:

$$\text{—}(E_2—P_3—Q_2—P_4)_j—L_1—(E_1(SO_2X)_d—P_1—Q_1—P_2)_i\text{—} \quad 8$$

$$\text{—}(E_1(Z_1)_d—P_1—Q_1—P_2)_i—L_1—(E_2—P_3—Q_2—P_4)_j\text{—} \quad 9$$

wherein:

$Z_1$ is a protogenic group such as —$SO_2X$, —$PO_3H_2$, —COX, and the like;

$E_1$ is an aromatic-containing moiety;

$E_2$ is an unsulfonated aromatic-containing and/or aliphatic-containing moiety;

$L_1$ is a linking group;

X is an —OH, a halogen, an ester, or

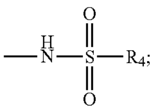

d is a number of $Z_1$ functional groups attached to $E_1$;

$P_1$, $P_2$, $P_3$, $P_4$ are each independently absent, —O—, —S—, —SO—, —$SO_2$—, —CO—, —NH—, $NR_2$—, —$R_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing the repetition of polymer segment 1 with I typically from 1 to 200; and j is a number representing the repetition of a polymer segment with j typically from 1 to 200.

In another variation of the present invention, the hydrophilic polymer region comprising polymer segments 10 while the hydrophobic polymer region comprises polymer segment 11:

$$E_1(Z_1)_d—P_1\text{-}Q_1\text{-}P_2 \quad 10$$

$$E_2(Z_1)_f—P_3 \quad 11$$

wherein:

$Z_1$ is a protogenic group such as —$SO_2X$, —$PO_3H_2$, —COX, and the like;

$E_1$, $E_2$ are each independently an aromatic or aliphatic-containing moiety wherein at least one of $E_1$ and $E_2$ include an aromatic substituted with $Z_1$;

X is an —OH, a halogen, an ester, or

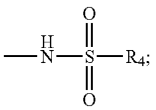

d is the number of $Z_1$ functional groups attached to $E_1$; In one refinement, d is equal to the number of aromatic rings in $E_1$. In another refinement, each aromatic ring in $E_1$ can have 0, 1, 2, 3, or 4 $Z_1$ groups. In still another refinement, d is an integer from 1 to 4 on average;

f is the number of $Z_1$ functional groups attached to $E_2$; In one refinement, f is equal to the number of aromatic rings in $E_2$. In another refinement, each aromatic ring in $E_2$ can have 0, 1, 2, 3, or 4 $Z_1$ groups. In still another refinement, f is an integer from 1 to 4 on average;

$P_1$, $P_2$, $P_3$ are each independently absent, —O—, —S—, —SO—, —$SO_2$—, —CO—, —NH—, $NR_2$—, or —$R_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety, with the proviso that when d is greater than zero, f is zero and when f is greater than zero d is zero.

Example for $Q_1$ and $Q_2$ in the above formulae are:

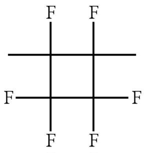
or
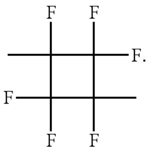

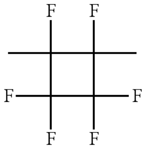
or
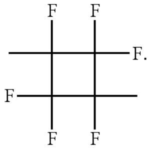

In each of the formulae 1-10, $E_1$ and $E_2$ include one or more aromatic rings. For example, $E_1$ and $E_2$, include one or more of the following moieties:

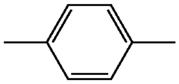
;
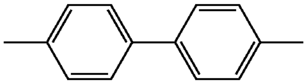
;
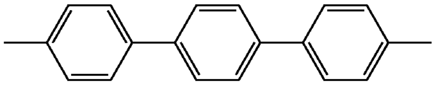
;
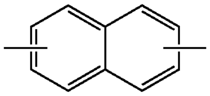
;
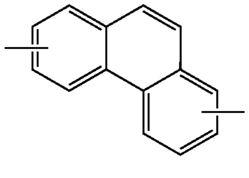
;

-continued

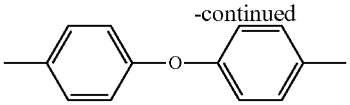
;
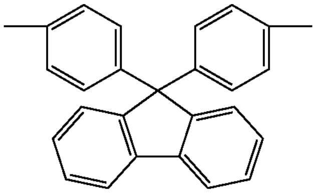
;
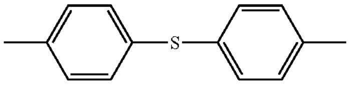
;
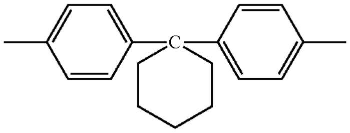
;
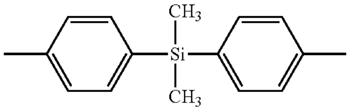
;
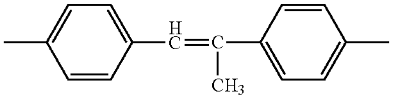
;
;
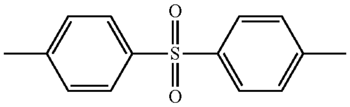
;
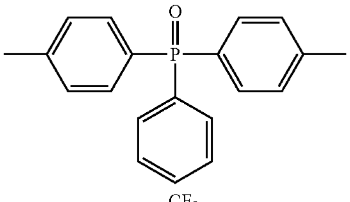
;
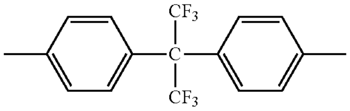
; and
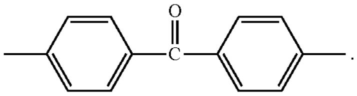

In another embodiment of the present invention, a method of forming an electrode catalyst layer for a fuel cell is provided. In accordance with this method, the ink composition is applied to a suitable substrate (e.g., ion conducting layer, gas diffusion layer). Virtually any method may be used to apply the ink composition. Such methods include, but are not limited to, brushing, painting, screen printing, and spraying.

The following examples illustrate the various embodiments of the present invention. Those skilled in the art will recognize many variations that are within the spirit of the present invention and scope of the claims.

Preparation of the Sulfonated Perfluorocyclobutyl (PFCB) Copolymer Membranes

In the present examples, two separate PFCB polymer resins are sulfonated and then used as a dispersant for fuel cell electrocatalyst inks. The number-average molecular weight ("Mn") of the resins is measured prior to sulfonation. The sulfonic acid substitution is then measured via titration after sulfonation.

Figure 2:
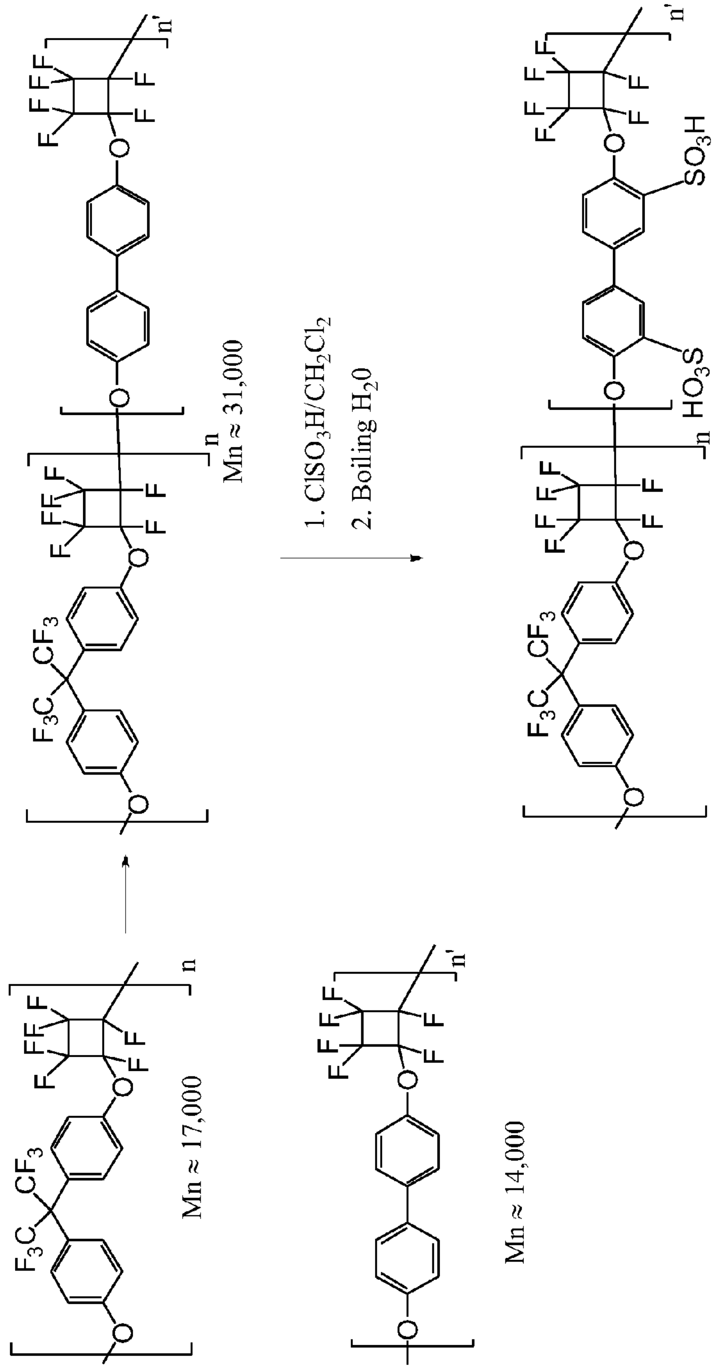
FIG. 2 provides a synthetic scheme for preparing a variation of a polymer dispersant useful in fuel cell electrocatalyst inks.

In the first resin architecture, a diblock copolymer designated as polymer dispersant A (TRJ230) is prepared at low Mn (31 kD before sulfonation) from a block oligomer melt where one block includes a deactivated moiety to sulfonation. (496 D/unit, Mn=17 kD is hydrophobic including the moiety hexafluoroisopropylidene ("6F") or diphenylether ("DPE"),) and the other block includes biphenylvinylether "BPVE", (346 D/unit before sulfonation, 506 D/unit after sulfonation, Mn=14 kD before sulfonation) becomes hydrophilic with sulfonation. The copolymer design provides a large hydrophobic block to drive adsorption on the carbon black surface in an alcohol/water solvent mixture, while the other block has a solvophilic tail that provides electrosteric stabilization of the electrocatalyst.

rosulfonation of the biphenyl segments of the polymer. Subsequent treatment in boiling water for 1 hour hydrolyzes the appended chlorosulfonate groups to sulfonic acid groups. The reactions are shown in FIG. 2, while further details are set forth below.

The Mn for the hydrophilic block of polymer dispersant A diblock resin polymer increases from 14.0 to 20.5 kD with complete sulfonation, while the hydrophobic block ("6F") remains constant at 17.0 kD. This gives a weight fraction for the sulfonated block of 54.7% with an equivalent weight for the hydrophilic block of 253 g/mol $SO_3H$ and with an ion-exchange capacity (I.E.C.) for the total copolymer of 2.16-meq. $SO_3H$ per gram (54.7%*1000/253) if all the biphenyl ("BP") groups are sulfonated. Accordingly, the actual degree-of-sulfonation (DS) for the BP groups in the copolymer A resin ranges from 84.7 to 96.3% as shown in Table 1 from the measured ion-exchange capacity range of 1.83 and 2.08 meq $SO_3H$ per gram of total polymer.

TABLE 1

Boiling water uptakes of sulfonated copolymer A membranes made with varied amounts of chlorosulfonic acid

| Expt. No. | $ClSO_3H$/TRJ230 | TRJ230g* | IEC | 100° C. vol % swell | 100° C. wt % $H_2O$ | density | ratio (g/g) |
|---|---|---|---|---|---|---|---|
| 103106 | 2.222 | 3.738 | 1.95 | 1530 | 1062 | 1.552 | gel |
| 110106 | 2.053 | 3.738 | 2.04 | 1026 | 813 | 1.506 | solution |
| 121206 | 1.650 | 3.77 | 2.08 | 205 | 142 | 1.526 | solution |
| 102606 | 1.600 | 3.738 | 1.83 | 166 | 204 | 1.456 | solution |
| 112106 | 1.570 | 3.739 | 1.86 | 126 | 75.8 | 1.456 | solution |
| 112906 | 1.316 | 3.737 | 1.94 | 97 | 65.2 | 1.452 | solution |
| 120506 | 1.196 | 3.808 | 1.84 | 58 | 34.0 | 1.393 | solution |
| Nafion 112 | | | 0.91 | 55.29 | 83.76 | 1.795 | |

*5 g/100 mL $CH_2Cl_2$ centrifuged
5 um filter

In the second resin architecture, another copolymer designated as polymer dispersant B (TRJ305) is prepared at a slightly higher Mn (~49 kD before sulfonation) whereby multiple BPVE oligomers (Mn=8 kD before sulfonation) react with 6F monomer to produce a multiblock design. In this case, the hydrophobic (including "6F" or "DPE" moeities) and hydrophilic blocks (including BPVE moieties) are no longer fully segregated to each end of the polymer backbone, but a higher Mn again drives a reasonable adsorption on the carbon surface.

The two unsulfonated polymer dispersants A and B (TRJ230 and TRJ305) are received from Tetramer Technologies, solvent fractionated via centrifugation, sulfonated with chlorosulfonic acid, and then solvent-cast into films or dried into a powder for later dissolution as a stock dispersant solution. The solvent-cast films have a measured ion-exchange capacity between 1.83 and 2.08 meq. $SO_3H$ per gram (in terms of equivalent weight, 480-545 g polymer per mole $SO_3H$) and swelling in boiling water that ranges between 58 and 1530 vol. %.

Figure 3:
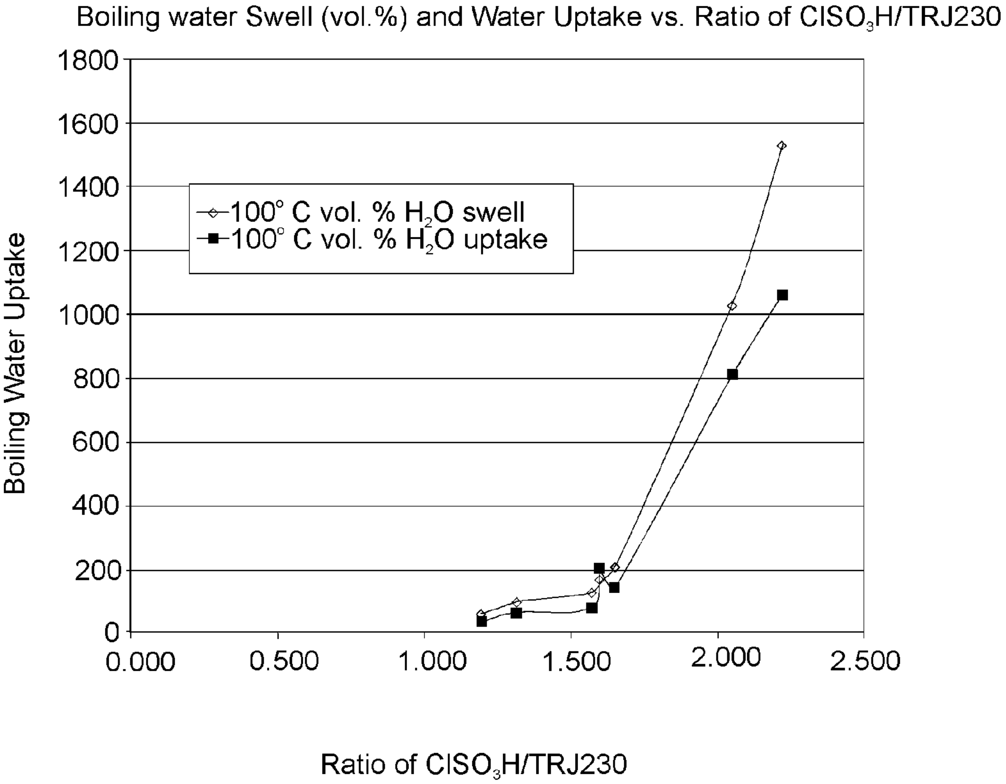
FIG. 3 provides a plot showing that the water uptake of membranes formed from copolymer A is strongly dependent on the feed ratio of chlorosulfonic acid to copolymer A resin.

The sulfonation process follows a similar procedure for both copolymer resins. For the polymer dispersant A resin, turbid dispersions are prepared in methylene chloride at 26.4 wt. % solids. Centrifugation is used to separate out the insoluble material (consisting of 26 wt. % of the polymer) from the clear solution containing 74 wt. % of the polymer. The clear polymer solution is then reacted with a 1.20-2.22 feed weight ratio of chlorosulfonic acid per weight resin. Chlorosulfonic acid selectively reacts with and affects chlo- With reference to FIG. 3, water uptakes are also measured for the sulfonated polymer dispersant A which is more dependent on the feed ratio of $ClSO_3H$/copolymer resin than on the measured ion-exchange capacity. The % volume boiling water swell and 100° C. wt. % water uptake increases markedly when the feed ratio of $ClSO_3H$ to polymer dispersant A weight exceeds 1.65.

In contrast, multiple hydrophilic oligomers are incorporated along the polymer backbone for the polymer dispersant B resin architecture. In this case, the Mn of the BPVE oligomer increases from 8.0 to 11.7 kD after sulfonation (with a DS at 100%). Since the measured ion-exchange capacity for the cast polymer dispersant B films again falls in the range of 1.8-2.1 meq per gram of polymer for the same chlorosulfonic acid feed ratio, the sulfonated polymer weight fraction is again near 55% of the total polymer. As a result, there are ~2.8 hydrophilic oligomers incorporated along the polymer backbone (55%*59.4/11.7) which are separated by the hydrophobic blocks; in turn, these hydrophobic blocks then number 2-4 per chain with a Mn between 6.7-13.4 kD.

Preparation of the Sulfonated PFCB Copolymer Solution

The cast or dried polymers are formulated as a 1.50-2.50% solids stock solution in a EtOH:H2O:iPrOH:1:1:1 (w/w) solvent mixture. The polymer dissolves readily in the solvent mixture and is typically then roller-milled for 1-2 hours at room temperature prior to use.

Synthetic Examples for PFCB Dispersant Copolymers a) Preparation of Perfluorocyclobutyl-Block Copolymer (polymer dispersant A, Mn~31 K). The block copolymerization procedure is performed on 100-gram scale as follows.

Mesitylene solutions of 6F-polymer (Mn~17K) and BP-polymer (Mn~14K) (50 wt % solids) are degassed individually with Ar for about 1 hr at 60° C. The BP-polymer solution is then added gradually to the flask containing 6F-polymer solution at 160° C. under Ar. After complete addition of the BP-polymer, the reaction mixture is stirred at 160° C. for an additional 16 hours. The temperature is then raised to 180° C. and mesitylene is removed by distillation. The residual solids are then heated as follows: 200° C. for 2 hrs, 210° C. for 2 hrs and finally 220° C. for 16 hrs. All the reactions are carried out in a 3-neck flask with mechanical stirring (stainless steel stirrer rod and a Teflon™ blade) and condenser. At the end of the reaction, the rigid polymer is cooled to 60° C. and dissolved in THF (25 wt % solids). The polymer is precipitated by pouring into methanol, filtered, and dried under vacuum at 60° C.

b) Preparation of Perfluorocyclobutyl-Block Copolymer (polymer dispersant B, Mn~49 K, 49.6 g, 91% yield). Diphenyl ether ("DPE") solutions of 6F monomer (16 g in 16 g DPE) and BPVE (TRJ 288, 8K, 38.4 g in 38.4 g DPE) are mixed together and degassed with Ar for about 1 hour at 75° C. The reaction mixture is then stirred (12 rpm) at 165 C overnight. The reaction mixture is then heated as follows: 180°C. overnight, 200° C. for 3 hrs, 220° C. for 6 hrs, 230° C. overnight while continually stirring at 12 rpm and finally 240° C. for 4 hrs. The reaction is carried out in a 3-neck glass flask with mechanical stirring (stainless steel stirrer rod and a Teflon™ blade) and condenser. At the end of the reaction, the viscous solution is cooled to 60° C. and diluted in THF (165 g, 25 wt % solids) at 60° C. with increased stirring speed. The polymer solution in THF is filtered through a 70 μm ETFE filter cloth and precipitated by slowly pouring into methanol (4 liters) while agitating with a glass rod. The cloudy methanol is decanted away and replaced with fresh methanol (2 liters). This mixture is stirred and allowed to stand for 1 hr to remove any residual THF, DPE and low molecular weight oligomers trapped in the precipitated polymer. The methanol is decanted away and the polymer dried under vacuum at 60° C. Trace amounts of DPE are suspected to be still present in the polymer. Soxhlet extraction is performed with methanol to remove traces of DPE from the copolymer. A batch of the polymer is fractionated as follows: The polymer is dissolved in methylene chloride and centrifuged for 30 minutes at 3400 rpm. The material did not separate into two layers and no fractionation is observed.

c) Preparation of Sulfonated Block Copolymer. Five grams of poly(biphenyl-perfluorovinyl ether)-(14,000 Mn)-co-poly (bisphenol-A-hexafluoroperfluorovinyl ether)-(17,000 Mn), obtained from Tetramer Technology (Pendleton, S.C.), is dissolved in methylene chloride (Aldrich, catalog number 61005-0040, 100 mL) and is centrifuged for 15 minutes. The clear supernatant solution is decanted off from the sediment, which is a white insoluble gel. The resultant solution (132 g) is magnetically stirred in a 250-mL, glass, screw cap jar with a Teflon™ face lined lid (Fisher Scientific, catalog number 02-911-467) on a programmable hot plate set at 40° C. with a stirring rate of 400 cycles per minute. Chlorosulfonic acid (5.98 g, Aldrich, catalog number 32,025-0) is added and the reaction mixture turns brownish-purple. After 30 minutes, a purple polymer precipitates out of the reaction mixture and the solution is brown. After one hour, the brown reaction solvent is poured off from the purple precipitate, which is then washed twice with methylene chloride (50 mL for each wash). The purple precipitate is washed with water using a Waring blender until a white polymer is obtained. The polymer is collected by filtration, boiled in 2 liters of water for 1 hour in a 4-liter beaker with magnetic stirring, collected by filtration and air-dried to obtain 5 grams of sulfonated block copolymer with an ion exchange capacity of 1.82 meq. $SO_3H$ per gram, as determined by titration with 0.0108 M sodium hydroxide. The polymer (3.5 g) dissolved in N,N-dimethylacetamide (15 g) is pressure filtered through a 0.5-micron Teflon™ Millipore filter and the yellow solution is coated on window-pane glass using an Erichsen coater set at 80° C. with a 3-mil Bird applicator bar with the coating gap adjusted with an additional layer of masking tape as a spacer. After oven-drying at 120° C. for two hours, the membrane is peeled from the glass using an atomized water sprayer to assist in release. The water uptake at room temperature is 31.6 wt. % and the volume swell is 27.7 vol. %. After boiling in water for 1-hour, the water uptake is 203.5 wt. % and the volume swell is 166 vol. %.

Rheology for a PFCB Polymer Dispersant A

Model cathode electrode inks are prepared in a EtOH:$H_2O$:iPrOH:2:2:1 solvent mixture. The 50% Pt/High Surface Carbon (HSC) electrocatalyst concentration (Tanaka Kikinzoku Kogyo K.K. supplier specifications of 6.61% volatile fraction at 150° C. in 1% $H_2/N_2$ and 132.2 $m^2/g$ carbon surface area; graphitized carbon type or "g") is fixed at 4.20% w/w of elemental carbon, while the PFSA polymer (perflourosulfonic acid, nominal equivalent weight=930 g/mol) concentration for the control ink is set at 1.47% w/w (i.e., I(PFSA)/C weight ratio=0.35). The polymer dispersant (polymer dispersant A with a chlorosulfonic acid/resin weight ratio=1.56-2.22) addition is expressed as mg per available carbon surface area on the electrocatalyst and ranges between 0.0-1.0 $mg/m^2$ carbon. Alternatively, this addition can be expressed as a dispersant polymer/elemental carbon weight ratio which ranges from 0.0 to 0.132 (i.e., D/C=0 to 0.132). The total sulfonated polymer mass is kept constant with dispersant addition so that the PFSA polymer weight fraction is decreased by 50% of the dispersant weight fraction (since the dispersant polymer has a sulfonated block at ~55% of the total diblock weight.)

The preparation procedure used the following addition sequence: electrocatalyst/makeup solvent premix/dispersant polymer solution/stock PFSA polymer solution/overnite ball milling. The rheology is then measured immediately following the ball milling step. All process steps are performed at room temperature (23+−2° C.).

Figure 4:
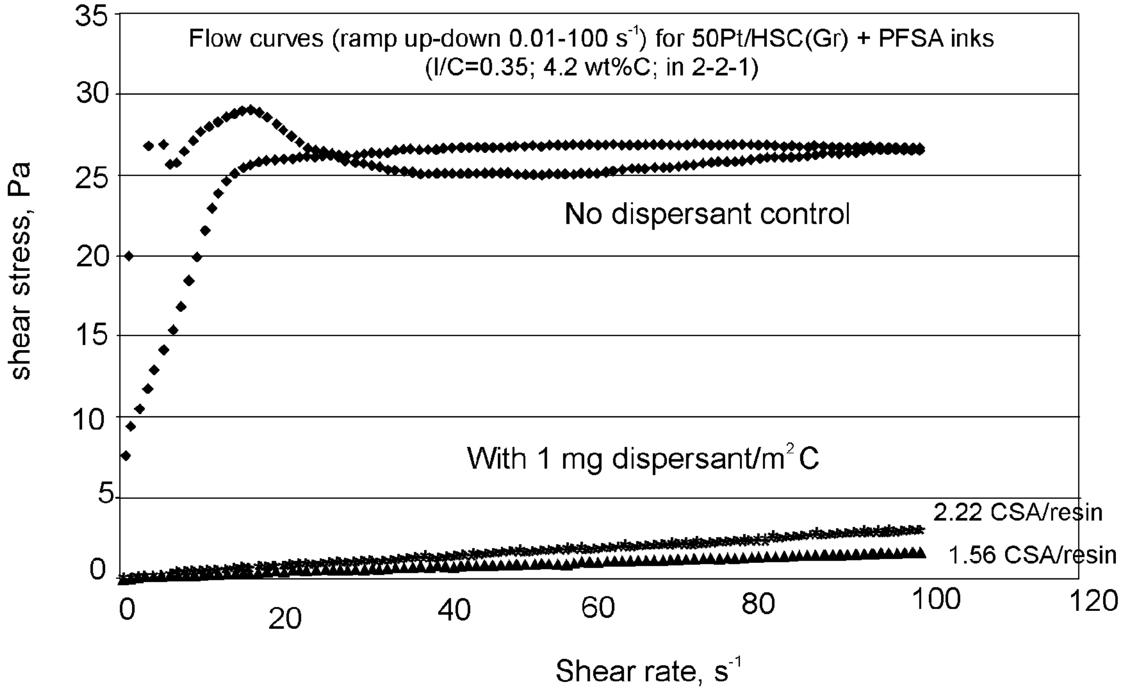
FIG. 4 provides flow curves for dispersant addition to a model electrocatalyst ink.

The control ink without any dispersant in FIG. 4 shows a large yield stress (~20 Pa) in the increasing shear rate ramp which indicates that the electrocatalyst agglomerates in the ink fluid. In contrast, the addition of 1 mg dispersant polymer/$m^2$ C removes this yield stress and shows a near Newtownian rheology (i.e., a near linear increase in shear stress with shear rate). The electrode ink rheology then is turned from a solid-like paste to a simple Newtownian liquid at dispersant loadings between 0.0-1.0 $mg/m^2$ carbon.

Figure 5:
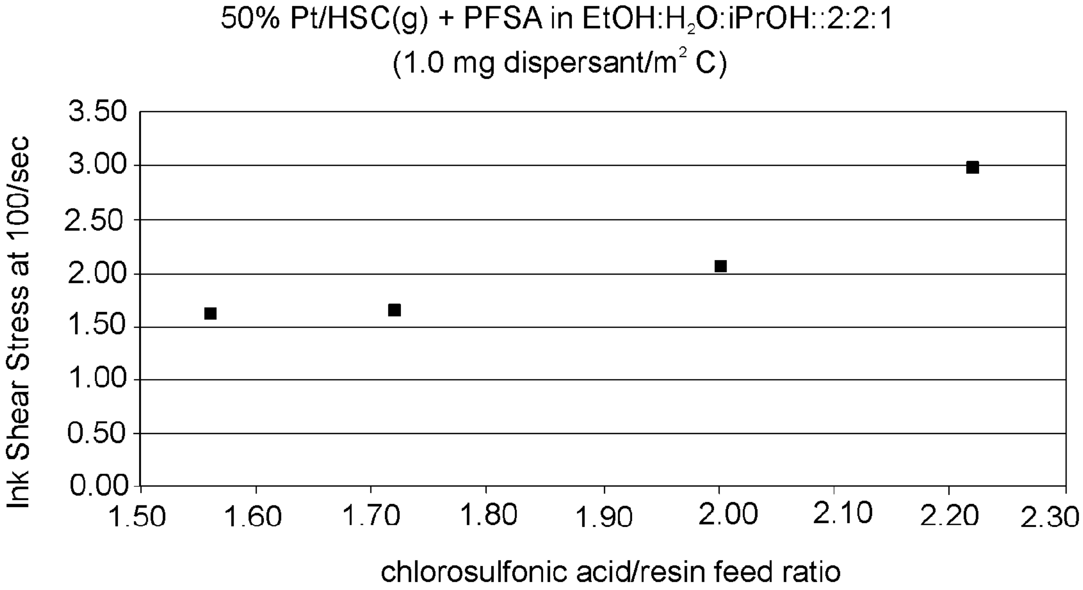
FIG. 5 provides plots of the asymptotic approach of ink viscosity at lower CSA/resin feed ratio in the dispersant polymer.

The sulfonation of the two dispersant polymers in FIG. 4 is also bracketed at the low (1.56) and high (2.22) chlorosulfonic acid (CSA)/resin feed ratios. The sulfonation procedure (chlorosulfonic acid/resin feed ratio) also affects the measured electrocatalyst ink rheology. In FIG. 5, the ink viscosity (i.e., the measured shear stress at a 100/sec shear rate) approaches a lower asymptotic limit at a lower feed ratio. This suggests that the dispersant at a lower CSA/resin ratio adsorbs more strongly to the carbon surface of the electrocatalyst which provides better electrosteric stabilization.

Figure 6:
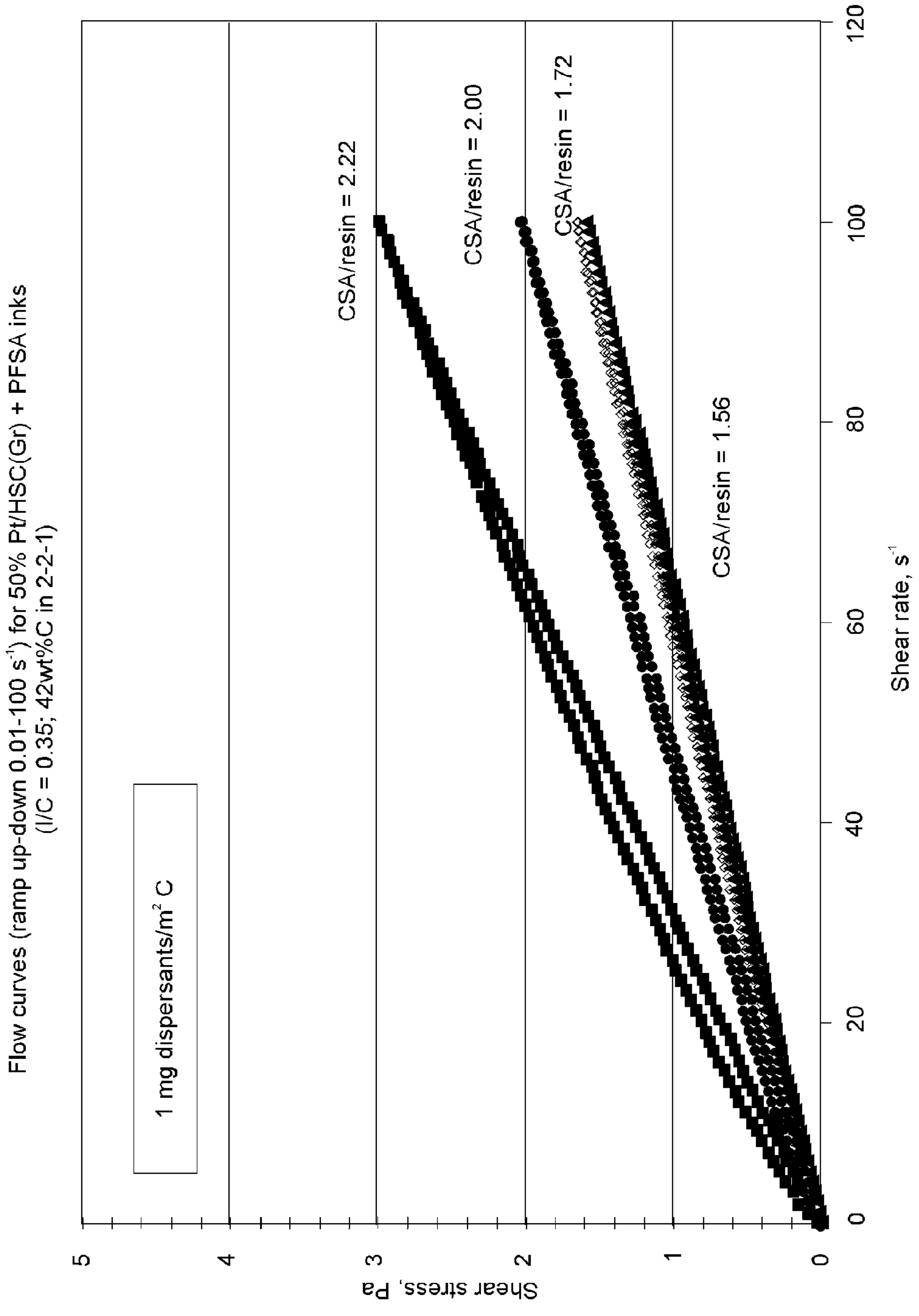
FIG. 6 provides Newtownian flow curves for a dispersant polymer at lower CSA/resin feed ratio.

Table 2 summarizes the measured apparent viscosity (shear stress divided by shear rate at 100 $sec^{-1}$), while FIG. 6 gives the flow curves for each electrocatalyst ink. This viscosity decreases and the flow curves becomes more Newtownian as the chlorosulfonic acid/resin feed ratio decreases in the PFCB sulfonation step.

TABLE 2

Asymptotic approach of ink viscosity at lower CSA/resin feed ratio in the dispersant polymer.

| CSA/resin (w/w) | % swell (boiling water) | ink shear stress (@ 100/sec, 1 mg disp/m2 C) |
|---|---|---|
| 1.56 | 126% | 1.60 |
| 1.72 | 205% | 1.66 |
| 2.00 | 1026% | 2.03 |
| 2.22 | 1506% | 2.99 |

Figure 7:
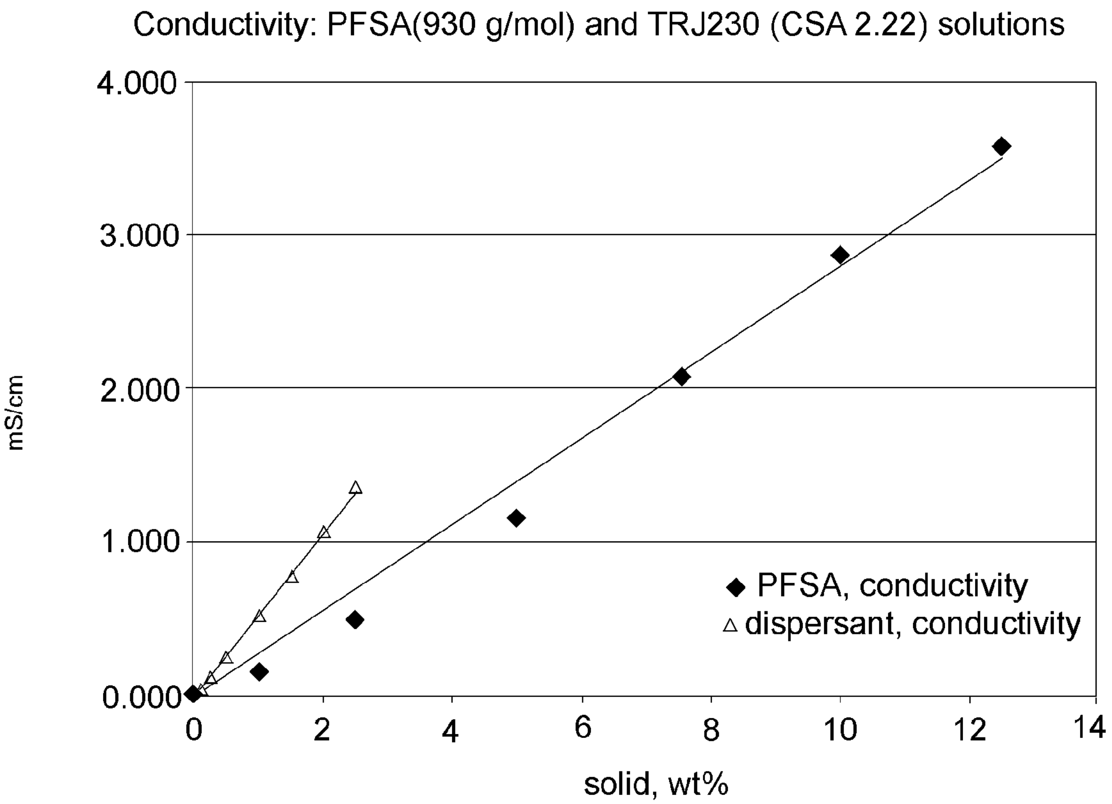
FIG. 7 provides a plot of the solution conductivity for a dispersant polymer example (copolymer A) dispersant-only vs PFSA polymer-only solutions in EtOH:H2O:iPrOH:1:1:1 solvent mixture.

The solution conductivity in FIG. 7 of the polymer dispersant A is higher than the PFSA polymer solution in EtOH:H2O:iPrOH:1:1:1 (w/w) solvent mixture. The dispersant polymer has a higher ion-exchange capacity range of 1.83-2.08 meq/g (or alternatively, 480 to 545 g/$SO_3H$ mol in equivalent weight) than the PFSA polymer (930 g/mol). This means that the $H^+$ release that dominates the solution conductivity for both polymers should be ~1.86× higher with the dispersant which agrees reasonably well with the measured value of 1.92 for a lot of polymer dispersant A.

Figure 8:
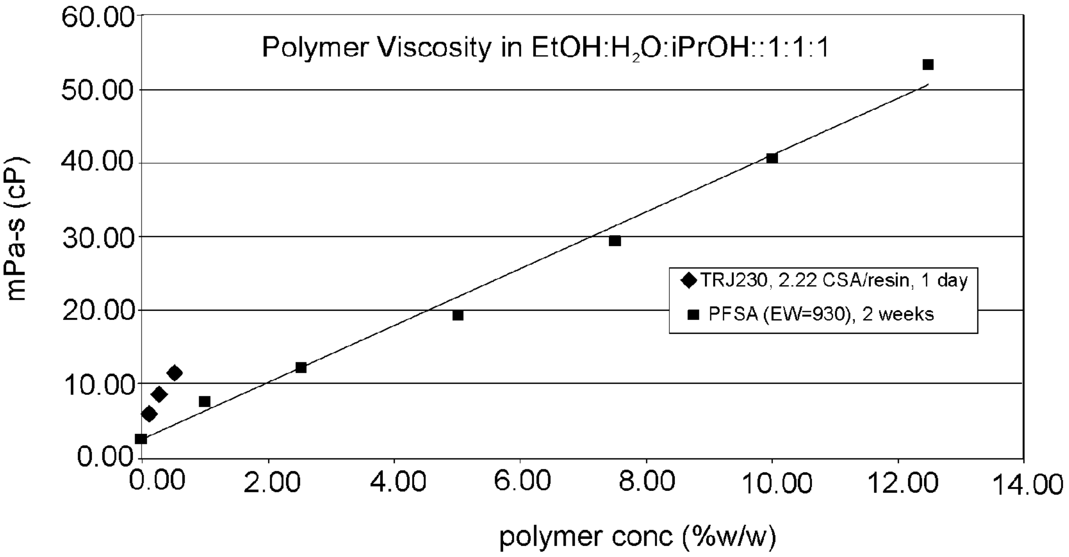
FIG. 8 provides a plot of the solution viscosity for polymer dispersant A and PFSA polymer in a EtOH:H2O:iPrOH:1:1:1 solvent mixture.

The solution viscosity of the dispersant polymer is also significantly higher than the PFSA ionomer. FIG. 8 shows the solvent viscosity (2.63 cP) increases more steeply (5.19×) with the addition of the polymer dispersant A (at a chlorosulfonic acid/resin feed ratio at 2.22).

Rheology and FC Performance for a Polymer Dispersant B

Model anode electrode inks are prepared in a EtOH:H2O:iPrOH:2:2:1 solvent mixture. The 20% Pt/Vulcan electrocatalyst concentration (TKK supplier with specifications of 2.50% volatile fraction at 150 C in 1% H2/N2 and 179.7 $m^2$/g carbon surface area; amorphous carbon or "a") is fixed at 4.40% w/w of elemental carbon, while the PFSA polymer (nominal equivalent weight=930 g/mol) concentration for the control ink is set at 2.64% w/w (i.e., I(PFSA)/C weight ratio=0.60).

The dispersant polymer (polymer dispersant B with a chlorosulfonic acid/resin weight ratio=2.24) addition ranges from 0.0 to 0.50 mg/$m^2$ carbon. Alternatively, this addition can be expressed as dispersant polymer/elemental carbon weight ratio which ranges from 0.0 to 0.090 (i.e., D/C=0 to 0.090). The total sulfonated polymer mass is again kept constant with dispersant addition so that the PFSA polymer weight fraction decreased by 50% of the dispersant weight fraction.

The preparation procedure again follows the sequence: electrocatalyst/makeup solvent premix/dispersant polymer solution/stock PFSA polymer solution/overnight ball milling. The rheology is then measured immediately following the ball milling step. All process steps are performed at room temperature (23+/−2° C.).

Figure 9:
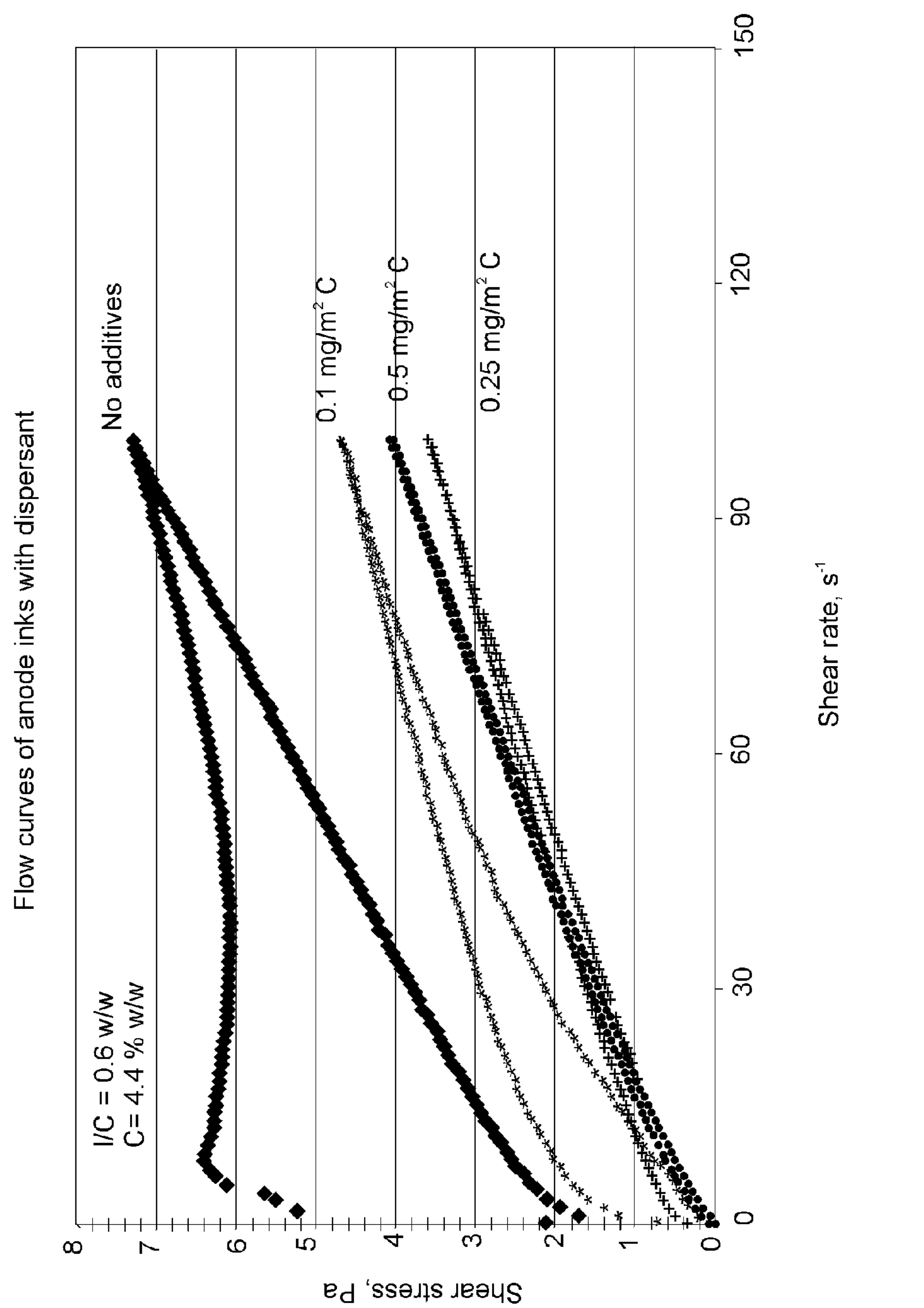
FIG. 9 provides flow curves from viscometry measurement for a dispersant addition series in a 20% Pt/V(a)+PFSA polymer electrode ink with a shear rate ramp of 0->100->0 liter/sec.

The control ink without any dispersant in Table 3 or FIG. 9 shows a larger yield stress (2.2 Pa) in the increasing shear rate ramp which indicates that the 20% Pt/V(a) electrocatalyst again agglomerates in the ink fluid. In contrast, the addition of 0.50 mg dispersant polymer/$m^2$ C removed this yield stress and showed a near Newtownian rheology (i.e., a near linear increase in shear stress with shear rate). This again demonstrates that the dispersant polymer addition can shift the 20% Pt/V catalyst ink rheology at concentrations as low as 0.10 mg dispersant/$m^2$ carbon or a D/C=0.018 where the I(PFSA)/C=0.60.

TABLE 3

Rheology (tan δ) comparison for a dispersant addition series in a 20% Pt/V(a) + PFSA polymer electrode ink.

| 20% Pt/V(a) EtOH:H2O:iPrOH :: 2:2:1 (w/w) | | | Viscometry, ramp up-down 0.01-100 s-1 | | preshear = 200 s-1-30 sec]; measure = 0.6 Pa-0.5 Hz-120 sec | | |
|---|---|---|---|---|---|---|---|
| carbon content, wt % | I/C | dispersant loading; mg/m2C | η at 100 s-1, cps | dymanic yield stress | G' | G" | tan δ (loss factor) |
| 4.40 | 0.6 | 0.0 | 73 | 2.2 | 93 | 12 | 0.1 |
| 4.40 | 0.6 | 0.10 | 47 | 0.8 | 0.79 | 1.10 | 1.4 |
| 4.40 | 0.6 | 0.25 | 36 | 0.3 | 0.28 | 0.50 | 1.8 |
| 4.40 | 0.6 | 0.50 | 41 | 0.1 | 0.03 | 0.21 | 7.6 |

Figure 10A:
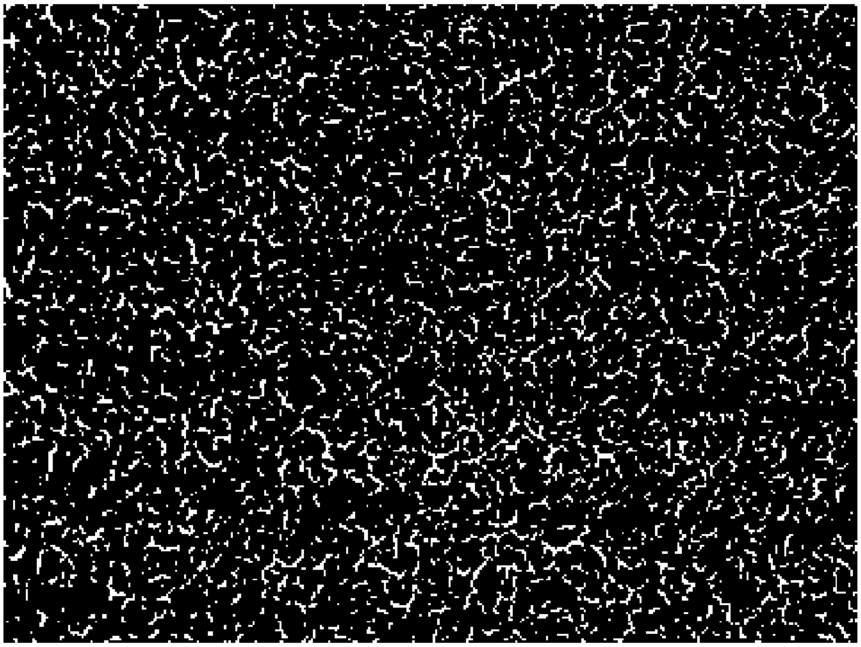
FIG. 10A provides a photograph of transmitted light through a control electrode decal without any dispersant addition.
Figure 10B:
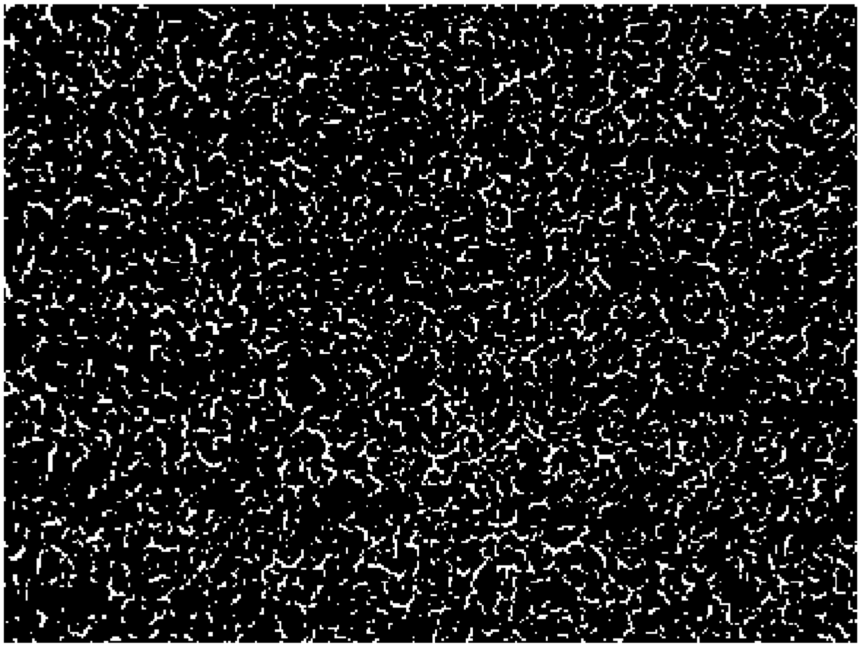
FIG. 10B provides a photograph of transmitted light through a control electrode decal with 0.1 mg dispersant/$m^2$ carbon FIG. 10C provides a photograph of transmitted light through a control electrode decal with 0.25 mg dispersant/$m^2$ carbon.
Figure 10C:
FIG. 10D provides a photograph of transmitted light through a control electrode decal with 0.50 mg dispersant/$m^2$ carbon.
Figure 10D:

The coating quality for the anode electrode decals is measured by the level of transmitted light in FIGS. 10A-D. The anode layers are coated at a nominal 0.40 mg elemental carbon/$cm^2$ with a Meyer rod on an ETFE (Ethylene-TetraFluoroEthylene) support film which produces a dry electrode thickness near 12 microns. Without any dispersant addition, the optical micrographs show a significant through-layer crack density on a scale that is finer than the separation between the coating ribs (0.76 mm) on the Meyer rod. This coating defect is significantly reduced at 0.10 mg dispersant/$m^2$ (FIG. 10B) and is no longer present at 0.50 mg dispersant/$m^2$ (FIG. 10B).

Figure 11A:
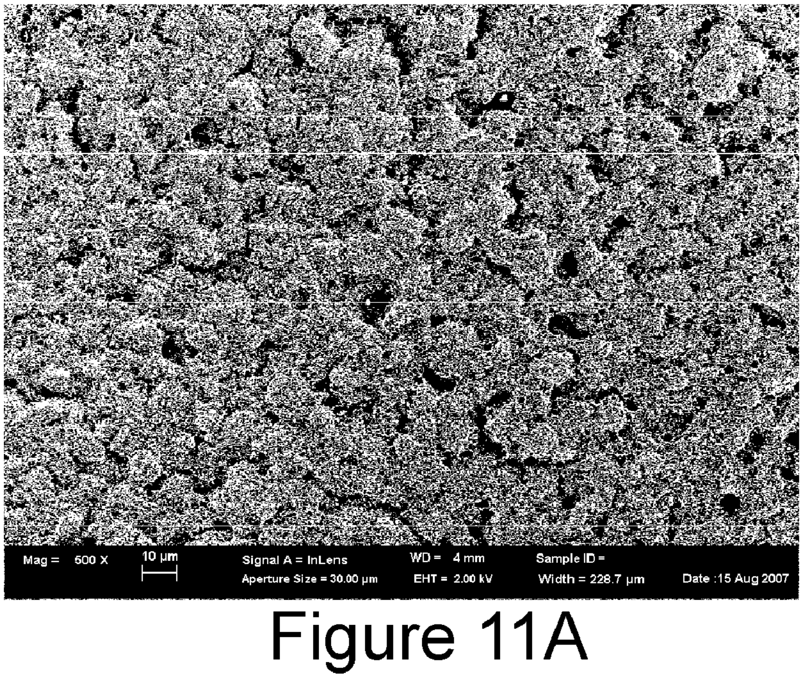
FIG. 11A is a secondary electron micrograph (SEM) for a control anode electrode decal without any dispersant addition.
Figure 11B:
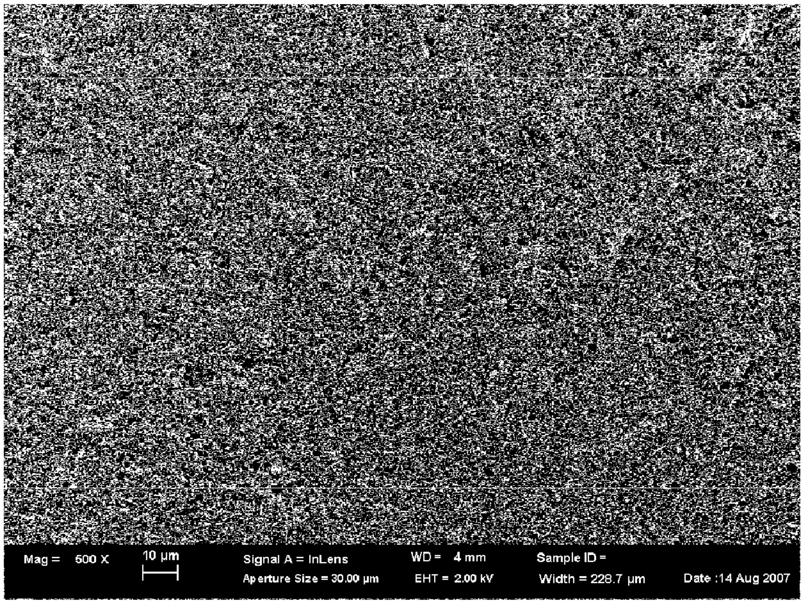
FIG. 11B is a secondary electron micrograph (SEM) for a control anode electrode decal with 0.1 mg dispersant/$m^2$ carbon.

The coating quality for the same anode electrode decals is also measured on a finer-scale (10 micron marker) with Secondary Electron Microscopy (SEM) in FIGS. 11A-B. Without any dispersant addition, the SEM micrograph shows a significant 1 to 10 micron-scale surface roughness which is then reduced with only a 0.10 mg dispersant/$m^2$ carbon loading.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. An ink composition for forming fuel cell electrodes, the ink composition comprising:
   a catalyst composition;
   a polymeric binder;
   a polymer dispersant comprising a polymer segment including a perfluorocyclobutyl group; and
   a solvent.

2. The ink composition of claim 1 wherein the catalyst composition comprises a precious metal.

3. The ink composition of claim 1 wherein the catalyst composition further comprises a catalyst support.

4. The ink composition of claim 3 wherein the weight ratio of polymer dispersant to catalyst support is from about 0.05 to 0.2.

5. The ink composition of claim 3 wherein the weight ratio of precious metal or precious metal oxide to support is from about 0.2 to 0.8.

6. The ink composition of claim 1 wherein the catalyst composition is present in an amount from about 1 to 6 weight percent of the total weight of the ink composition.

7. The ink composition of claim 1 wherein the polymeric binder is present in an amount from about 1 to about 5 weight percent of the total weight of the ink composition.

8. The ink composition of claim 1 wherein the polymer dispersant is present in an amount of 0.5 to 5 weight percent of the total weight of the ink composition.

9. The ink composition of claim 1 wherein the polymer segment including a perfluorcyclobutyl group has the following formula:

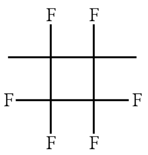

or

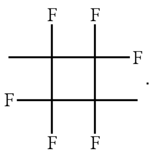

.

10. The ink composition of claim 7 wherein the polymer dispersant includes a hydrophobic region and a hydrophilic region.

11. The ink composition of claim 10 wherein the hydrophilic region has an ion exchange capacity from about 1 to about 4 meq per gram.

12. The ink composition of claim 1 wherein the polymer dispersant includes a hydrophilic polymer region comprising polymer segment 2 and a hydrophobic polymer region comprising polymer segment 3:

$$[E_1(Z_1)_d]-P_1-Q_1-P_2 \qquad 2$$

$$E_2-P_3-Q_2-P_4 \qquad 3$$

wherein:

$Z_1$ is $-SO_2X$, $-PO_3H_2$, or $-COX$;

$E_1$ is an aromatic containing moiety;

$E_2$ is an unsulfonated aromatic-containing and/or aliphatic-containing moiety;

X is an —OH, a halogen, an ester, or

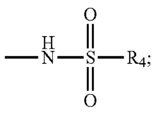

d is the number of $Z_1$ attached to $E_1$;

$P_1$, $P_2$, $P_3$, $P_4$ are each independently absent, —O—, —S—, —SO—, —CO—, $-SO_2-$, —NH—, $NR_2-$, or $-R_3-$;

$R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$, $Q_2$ are each independently a fluorinated cyclobutyl moiety.

13. The ink composition of claim 1 wherein the polymer dispersant includes a hydrophilic polymer region comprising polymer segment 4 and a hydrophobic polymer region comprising polymer segment 5:

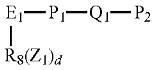

4

$$E_2-P_3-Q_2-P_4 \qquad 5$$

wherein:

$Z_1$ is $-SO_2X$, $-PO_3H_2$, or $-COX$;

$E_1$, $E_2$ are each independently an aromatic-containing and/or aliphatic-containing moiety;

X is an —OH, a halogen, an ester, or

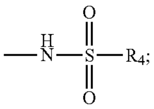

d is the number of $Z_1$ attached to $R_8$;

$P_1$, $P_2$, $P_3$, $P_4$ are each independently absent, —O—, —S—, —SO—, —CO—, $-SO_2-$, —NH—, $NR_2-$, or $-R_3-$;

$R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, perfluoroalkyl ether, alkylether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$R_8(Z_1)_d$ is a moiety having d number of protogenic groups; and $Q_1$, $Q_2$ are each independently a fluorinated cyclobutyl moiety.

14. The ink composition of claim 1 wherein the polymer dispersant includes a hydrophilic polymer region comprising polymer segment 6 and a hydrophobic polymer region comprising polymer segment 7:

$$E_1(SO_2X)_d-P_1-Q_1-P_2 \qquad 6$$

$$E_2-P_3-Q_2-P_4 \qquad 7$$

connected by a linking group $L_1$ to form polymer units 8 and 9:

$$-(E_2-P_3-Q_2-P_4)_j-L_1-(E_1(SO_2X)_d-P_1-Q_1-P_2)_i- \qquad 8$$

$$-(E_1(Z_1)_d-P_1-Q_1-P_2)_i-L_1-(E_2-P_3-Q_2-P_4)_j- \qquad 9$$

wherein:

$Z_1$ is $-SO_2X$, $-PO_3H_2$, or $-COX$;

$E_1$ is an aromatic-containing moiety;

$E_2$ is an unsulfonated aromatic-containing and/or aliphatic-containing moiety;

$L_1$ is a linking group;

X is an —OH, a halogen, an ester, or

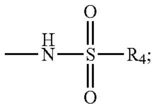

d is a number of $Z_1$ functional groups attached to $E_1$;

$P_1$, $P_2$, $P_3$, $P_4$ are each independently absent, —O—, —S—, —SO—, —$SO_2$—, —CO—, —NH—, $NR_2$—, —$R_3$—, and $R_2$ is $C_{1-25}$ alkyl, $C_{1-25}$ aryl or $C_{1-25}$ arylene;

$R_3$ is $C_{1-25}$ alkylene, $C_{1-25}$ perfluoroalkylene, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group;

$Q_1$, $Q_2$ are each independently a fluorinated cyclobutyl moiety;

i is a number representing repetition of polymer segment 6; and j is a number representing repetition of polymer segment 7.

15. The ink composition of claim 1 wherein the polymer dispersant includes a hydrophilic polymer region comprising polymer segment 10 and a hydrophobic polymer region comprising polymer segment 11:

$$E_1(Z_1)_d—P_1\text{-}Q_1\text{-}P_2 \quad 10$$

$$E_2(Z_1)_f—P_3 \quad 11$$

wherein:

$Z_1$ is a —$SO_2X$, —$PO_3H_2$, or —COX;

$E_1$, $E_2$ are each independently an aromatic or aliphatic-containing moiety wherein at least one of $E_1$ and $E_2$ include an aromatic substituted with $Z_1$;

X is an —OH, a halogen, an ester, or

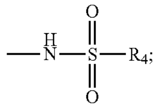

d is the number of $Z_1$ functional groups attached to $E_1$;

f is the number of $Z_1$ functional groups attached to $E_2$;

$P_1$, $P_2$, $P_3$ are each independently absent, —O—, —S—, —SO—, —$SO_2$—, —CO—, —NH—, $NR_2$—, or —$R_3$—;

$R_2$ is $C_{1-25}$ alkyl, $C_{1-25}$ aryl, or $C_{1-25}$ arylene;

$R_3$ is $C_{1-25}$ alkylene, $C_{1-25}$ perfluoroalkylene, perfluoroalkyl ether, alkyl ether, or $C_{1-25}$ arylene;

$R_4$ is trifluoromethyl, $C_{1-25}$ alkyl, $C_{1-25}$ perfluoroalkylene, $C_{1-25}$ aryl, or another $E_1$ group; and $Q_1$ is a fluorinated cyclobutyl moiety, with the proviso that when d is greater than zero, f is zero and when f is greater than zero d is zero.

* * * * *